US006485402B1

(12) United States Patent
Bauer

(10) Patent No.: US 6,485,402 B1
(45) Date of Patent: Nov. 26, 2002

(54) DEVICE FOR HEATING A MOVING MATERIAL STRIP, ESPECIALLY PREHEATER FOR A CORRUGATED BOARD MACHINE

(75) Inventor: Thomas Bauer, Immenreuth (DE)

(73) Assignee: BHS Corrugated Maschinen-und Anlagenbau GmbH, Weiherhammer (DE)

( * ) Notice: Subject to any disclaimer, the term of this patent is extended or adjusted under 35 U.S.C. 154(b) by 0 days.

(21) Appl. No.: 09/623,324

(22) PCT Filed: Apr. 13, 1999

(86) PCT No.: PCT/DE99/01105

§ 371 (c)(1),
(2), (4) Date: Sep. 1, 2000

(87) PCT Pub. No.: WO99/52707

PCT Pub. Date: Oct. 21, 1999

(30) Foreign Application Priority Data

Apr. 16, 1998 (DE) ........................................ 198 16 931

(51) Int. Cl.[7] ............................ B05D 5/00; B32B 31/00
(52) U.S. Cl. ....................................... 493/332; 156/499
(58) Field of Search ................................ 493/332, 335, 493/334, 336, 337; 156/205, 359, 470, 471, 494, 495, 496, 499; 226/21, 23, 24; 242/615.2, 615.4; 412/230, 246

(56) References Cited

U.S. PATENT DOCUMENTS

| | | | | |
|---|---|---|---|---|
| 3,004,880 A | * 10/1961 | Lord | 156/359 |
| 3,694,927 A | * 10/1972 | Sorenson | 156/499 |
| 3,960,475 A | * 6/1976 | DeLigt et al. | 156/359 |
| 3,981,758 A | 9/1976 | Stansbury | |
| 4,038,122 A | * 7/1977 | DeLigt | 156/470 |
| 4,071,392 A | * 1/1978 | Chaudhuri | 156/359 |
| 5,098,512 A | 3/1992 | Minoru | |
| 5,783,006 A | * 7/1998 | Klockenkemper et al. | 156/359 |
| 5,916,409 A | * 6/1999 | Mosburger | 156/499 |
| 6,149,751 A | * 11/2000 | Marschke | 156/205 |

FOREIGN PATENT DOCUMENTS

| | | |
|---|---|---|
| DE | 1511061 A | 7/1969 |
| DE | 2302449 A | 8/1974 |

* cited by examiner

*Primary Examiner*—Eugene Kim
*Assistant Examiner*—Louis Huynh
(74) *Attorney, Agent, or Firm*—Shaffer & Culbertson, LLP

(57) ABSTRACT

The invention pertains to a heating arrangement for a moving material web, particularly a pre-heater for a corrugated cardboard facility, with a rotating heating roll (3) which can be wrapped around by the material web (13) to be heated at a predetermined looping angle, and with at least two guide mechanisms (7, 11) for the material web which can pivot around the periphery of the heating roll while maintaining their relative positions to each other. The looping angle is determined by means of the position of a first (7) of the at least two guide mechanisms. A second (11) of the at least two guide mechanisms is arranged relative to the first guide mechanism such that in the position of the guide mechanisms defining the maximum looping angle, the material web (13) not directly wrapping around the heating roll (3) is guided at a distance from the heating roll by means of a second guide mechanism (11). According to the invention, a third guide mechanism (9) is provided which, in the direction of the circumference of the heating roll (3) and in a position opposite the position of maximum looping angle, completely lifts the web from the periphery of the heating roll (3) at the position defining the minimum looping angle.

19 Claims, 2 Drawing Sheets

DEVICE FOR HEATING A MOVING MATERIAL STRIP, ESPECIALLY PREHEATER FOR A CORRUGATED BOARD MACHINE

TECHNICAL FIELD OF THE INVENTION

The invention pertains to a heating arrangement for a moving material web or strip particularly a pre-heater for a corrugated cardboard facility having the a heating roll for transferring heat to the moving material web.

BACKGROUND OF THE INVENTION

A heating arrangement for use in preheating a moving material web is known, for example, from DE 23 02 449 C3. Said arrangement consists of a heating roll which can be heated, preferably, by means of steam as a thermal medium. Heating of a material web occurs by means of the fact that said material web wraps around a heating roll at a predetermined looping angle. In order to be able to adjust the amount of thermal energy supplied, two guide rolls are provided in the known arrangement which can pivot about the outer periphery of the heating roll. Said guide rolls feature a fixed relative position to each other and, for said purpose, are arranged on two arms connected to each other in a rigid connection. Said arms can pivot together about the axis of a heating roll by means of a suitable driver.

In a position defining the minimum looping angle, both guide rolls are positioned out of contact with the material web. Said material web, which is supplied by means of a fixed guide roll on the inlet side, passes around the heating roll in this position at a certain remaining looping angle to a fixed guide roll on the outlet side.

Both pivotable guide rolls can pivot, in the direction of the circumference, away from said position until the front guide roll in the pivoting direction comes into contact with the material web. If the two guide mechanisms are pivoted further, the looping angle increases accordingly. In order to avoid dragging the web section between the fixed guide roll on the inlet side and the roll defining the looping angle, said web section, after a certain pivoting angle has been exceeded (calculated from the position of the minimum looping angle) is held, together with the second pivotable guide roll, at a sufficient clearance from the heating roll.

This known heating arrangement enables a maximum looping angle. In addition, this embodiment ensures, at the position of the minimum looping angle (remaining looping angle), an extremely simple feed of a material web to be heated. This is because the material web need only be guided between the peripheral surface of the heating roll and the two pivotable guide rolls.

Nonetheless, a disadvantage of said heating arrangement is that there is a certain remaining looping angle and as a result, a definite minimum amount of thermal energy is unavoidably applied to the material web.

In addition, an arrangement for preparing a material in web form, such as corrugated cardboard for gluing, is known from DE-OS 15 11 061, for which a material web likewise is guided about a pivotable guide roll. In the position resulting in a minimum looping angle with the use of one individual guide roll, an additional guide roll moves into engagement, in said known arrangement, which in this position lifts the material web completely from the surface of the periphery of the heating roll. In said position with a zero looping angle, the material web forms an S shape between the two guide rolls. Again, the guide roll which lifts the material web at the position having a zero looping angle is in fixed connection with the guide roll defining the looping angle. Both guide rolls can pivot about the axis of the heating roll by means of a pivoting arm. Consequently, this arrangement allows the application of energy to the material web to be eliminated completely in the position of zero looping angle.

However, a disadvantage of said known arrangement is that only a relatively limited maximum looping angle may be achieved. With this known embodiment, increasing the diameter of the heating roll is the only way to achieve an increase in the heated length. This is accompanied by considerable cost.

Starting from this state of the art, the underlying purpose of the invention is to create a heating arrangement for a moving material web, particularly a pre-heater for a corrugated cardboard facility, for which a maximum heated length of said material web is achieved at the least possible expense and for which at the same time, the heated length can be adjusted to zero in a simple way.

SUMMARY OF THE INVENTION

Providing a third guide mechanism according to the invention, which of course, can also be in the form of a guide roll, for a heating arrangement according to DE 23 02 449 C3, achieves both the advantages of providing a maximum looping angle (and consequently a maximum heatable length of a material web) and also of varying the looping angle or the heatable length to zero.

According to the preferred embodiment of the invention, all guide mechanisms are connected to a carrier which can pivot about the axis of a heating roll. In this connection, all guide mechanisms can feature the same clearance from the periphery of the heating roll.

In the preferred embodiment of the invention, the third guide mechanism, which lifts a material web at the position of zero looping angle, is arranged at a minimum permissible clearance from the first guide mechanism in the direction of the circumference of the heating roll. This provides the advantage of a maximum looping angle since the three guide mechanisms which pivot together can pivot by the maximum possible angle before the third guide mechanism comes into contact with the entering or exiting section of the material web. Of course, the third guide mechanism must be arranged in the radial direction (with respect to the heating roll), such that in the position of zero looping angle, a lifting of the material web from the peripheral surface of the heating roll actually occurs.

According to the preferred embodiment of the invention, a material web is supplied by means of a fixed guide mechanism on the inlet side and carried off by means of a fixed guide mechanism on the outlet side, wherein the guide mechanisms on the inlet side and outlet side are located, in essence, on a straight line with the axis of the heating roll. This provides the advantage of the maximum possible looping angle. This is approximately 270–280°.

According to one embodiment of the invention, the third guide mechanism may, with respect to the heating roll, be offset in an outward radial direction in comparison with the first guide mechanism. In this connection a material web wraps around the first and third guide mechanism in an S shape in the position of the minimum looping angle (zero looping angle).

If in said embodiment, the third guide mechanism is arranged within the mid-point angle defined by means of the axes of the first and second guide mechanisms and the axis of the heating roll, then the guide mechanisms can pivot until the first guide mechanism barely does not come into contact with the section of the material web on the inlet side or outlet side. This provides the maximum looping angle.

In this embodiment, in the position of zero looping angle, the material web wraps around the first and third guide mechanisms in an extreme S shape. Again, this makes threading a material web more difficult, for example, after a tear. For this reason, a third guide mechanism can be transported from the normal working position into a threading position in front of the first guide mechanism in the direction of the circumference of the heating roll. This may occur, for example, by means of pivoting the third guide mechanism about the axis of the first guide mechanism. In this connection, it may be preferable to develop a third guide mechanism that can be locked in the threading position and/or working position.

BRIEF DESCRIPTION OF THE DRAWINGS

In the following, the invention is explained in greater detail with the aid of an embodiment represented in the figure. Shown in the drawing are.

DESCRIPTION OF THE PREFERRED EMBODIMENTS

Figure 1:
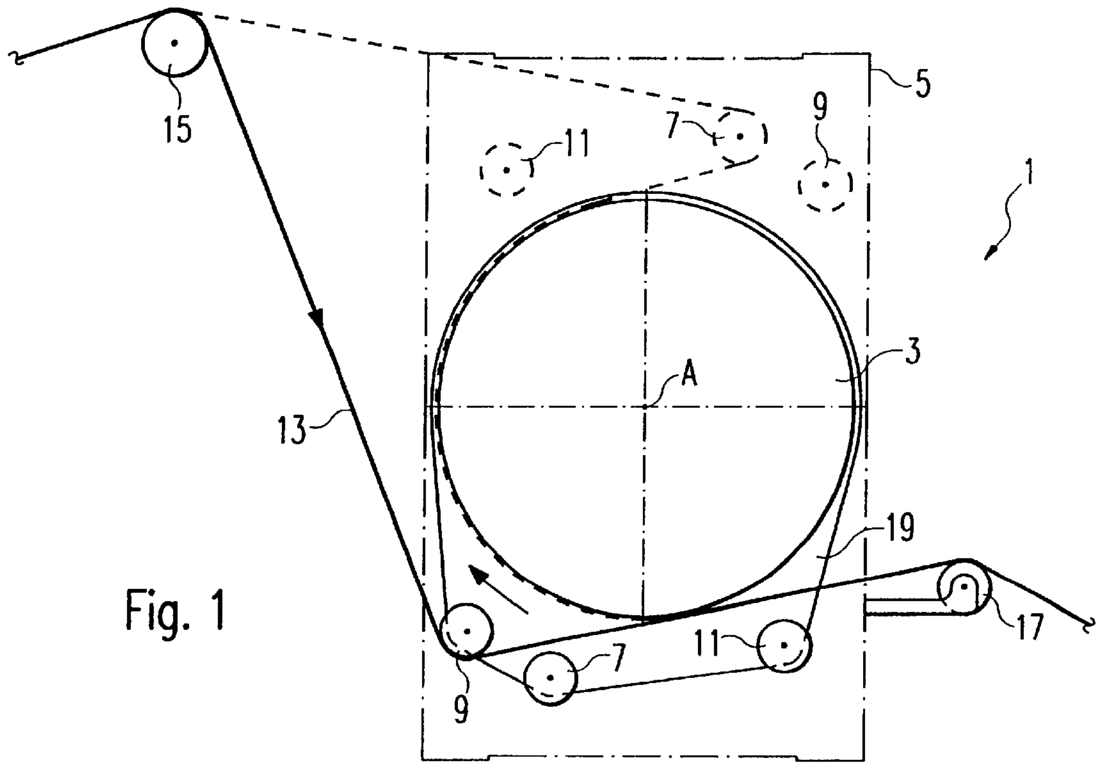
FIG. 1, a first embodiment of a heating arrangement according to the invention, having three guide rolls, in the position of zero looping angle.

FIG. 1 shows, in a schematic side view, a first embodiment of a heating arrangement according to the invention. The heating arrangement (1) comprises a heating roll (3) which is carried on a machine frame (5), represented only schematically, and is driven in a rotating manner. The heating roll (3) may be heated, for example, by means of hot steam.

The heating arrangement (1) moreover comprises three guide mechanisms (7, 9, 11) which preferably may be in the form of guide rolls.

A material web to be heated is supplied to the heating arrangement (1) by means of a stationary guide mechanism (15) on the inlet side and carried off by means of a similar stationary guide mechanism (17) on the outlet side. The stationary guide mechanisms (15, 17) either may be integrated in the heating arrangement (1) or else may be components of machines or system parts arranged in front of or after the heating arrangement.

In the position represented with solid lines in FIG. 1, a material web (13) to be heated first is supplied to a guide roll (9) and passes from this roll to a stationary guide roll (17) on the outlet side without coming into contact with the heating roll (3). In this position, practically no application of thermal energy to the material web (13) occurs (apart from radiant heat).

The guide rolls (7, 9, 11) are carried, and preferably are able to turn, on a part (19) which pivots about the axis (A). Of course, corresponding pivotable parts (19) also may be provided at both sides of the heating roll (3), and these parts support the guide rolls (7, 9, 11) at both sides and allow the rolls to turn. Pivotable side parts (19) then may pivot about the axis (A) of a heating roll (3) by means of a suitable driver.

If the three guide mechanisms (7, 9, 11) are moved in the direction of the circumference of a heating roll (3) by pivoting the carrier (19) in the direction of the arrow (FIG. 1), then the material web (13) is placed on the peripheral surface of the heating roll with an increasing looping angle. Of course, increasing the looping angle increases the heated length of the material web, which raises the amount of heat applied to the material web (13), for a constant web speed. In FIG. 1, an additional intermediate position of the guide rolls (7, 9, 11) is shown in dashed lines. This position corresponds approximately to a pivoting of the guide mechanisms (7, 9, 11) by a pivoting angle of 180°. In this position, a material web (13) is first supplied from a stationary guide mechanism (15) on the inlet side to a guide roll (7), wraps around the latter and then passes on to the peripheral surface of a heating roll (3). The heating roll is wrapped around at a looping angle of approximately 180° before the material web (13) is carried off by means of a stationary guide roll (17) on the outlet side.

Figure 2:
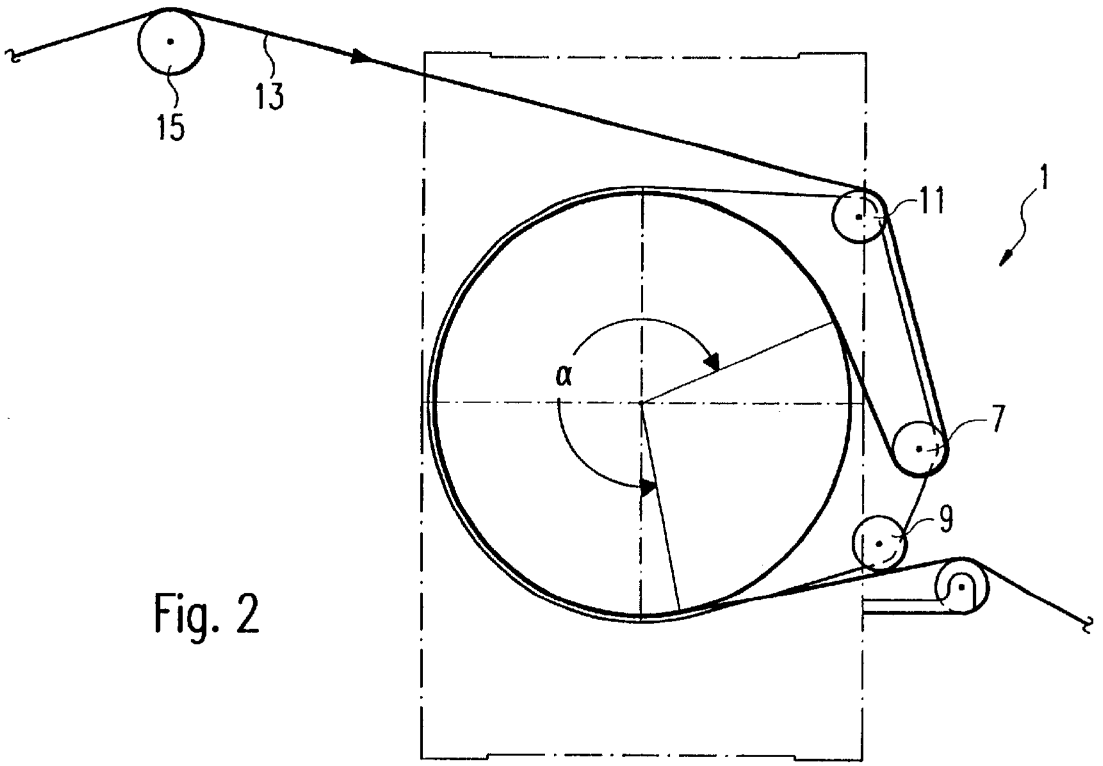
FIG. 2, the embodiment of FIG. 1 in the position of maximum looping angle.

FIG. 2 shows the maximum looping angle ($\alpha_{max}$) for the embodiment according to FIG. 1. In this position of the guide rolls (7, 9, 11), the guide roll (9) barely does not come into contact with the section of the material web on the outlet side. Although it is possible, in principle, to pivot the guide rolls further, this would lead to a wandering outlet side section of the material web (19), due to contact with the guide roll (9) in a direction in which said section would be lifted increasingly away from the peripheral surface of the heating roll (3). Consequently, the overall looping angle that can be achieved remain constant in any case.

In the position, represented in FIG. 2, of the maximum possible looping angle ($\alpha_{max}$), the guide roll (7) which defines the looping angle is wrapped around by the same amount as in the intermediate position represented with a dashed line in FIG. 1. Nonetheless, in this position of maximum looping angle, the material web (13), from the stationary guide mechanism (15) on the inlet side, passes first onto the guide roll (11) and only from there onto the guide roll (7). The guide roll (11) prevents contact or dragging the section of the material web (13) on the inlet side with the heating roll or with the material web already wrapped around the heating roll.

Consequently, it becomes clear from FIGS. 1 and 2 that both a zero looping angle (FIG. 1) as well as a greater maximum looping angle ($\alpha_{max}$) is achievable with the use of three guide rolls (7, 9, 11).

Figure 3:
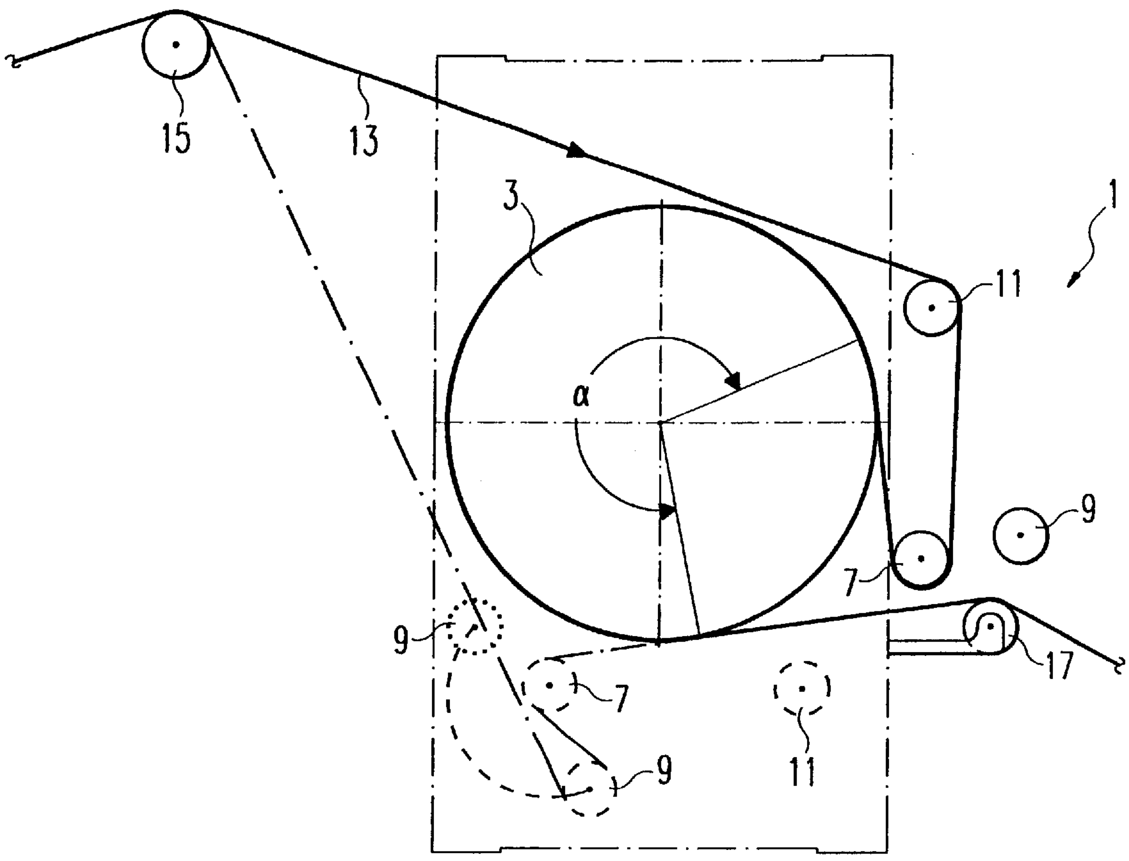
FIG. 3, an additional embodiment of a heating arrangement according to the invention, which guarantees the maximum possible looping angle.

The additional embodiment of the invention represented in FIG. 3 corresponds, in essence, to the embodiment according to FIGS. 1 and 2. However, the guide roll (9) is arranged such that the latter in the normal working position with respect to the heating roll (3), is offset, in essence, in an outward radial direction in comparison to the guide roll (7) defining the looping angle.

This does result in a slightly greater spatial requirement for the heating arrangement (1); however, this structural shape enables a still greater maximum looping angle ($\alpha_{max}$). In the position of zero looping angle represented by the dashed line in FIG. 3, the material web (13) is guided around the guide rolls (7 or 9) in an extreme S shape before the material web is carried off by means of the stationary guide mechanism (17) on the outlet side. This makes threading a material web (13) more difficult (practically independent of the position of the guide rolls (7, 9, 11)). In order to create a remedy for this disadvantage, a guide roll (9) can be formed so that it can move from the normal working position represented by the dashed line in FIG. 3 into a threading position. This may be achieved, for example, by forming a guide roll (9) that can pivot about the axis of the guide roll (7). The threading position of the guide roll (9) is represented in FIG. 3 by a dashed line. In this position, a material web (13) may be threaded easily past the outside of a guide roll (9) and between the insides of the guide rolls (7, 11) and the outer periphery of the heating roll (3).

In order to guarantee a secure threading of or operation of a heating arrangement, a guide roll (9) of course, can be formed so that it can be locked in the threading position or in the normal working position.

This embodiment represented in FIG. 3 has the advantage that the guide roll (7) defining the looping angle can pivot practically up to the section of the material web 13 on the outlet side. In contrast to the embodiment according to FIGS. 1 and 2, the guide roll (9) does not limit the maximum achievable looping angle.

In this position of maximum possible looping angle, represented with solid lines in FIG. 3, a guide roll (11), of course, must still guarantee that the section of the material web (13) on the inlet side is out of contact as much as possible with the peripheral surface of the heating roll (3) or that the material web wraps around this same roll. The position of the guide roll (11) can be freely selected with large tolerances for this purpose.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A heating arrangement for a moving material web, the heating arrangement including:

(a) a heating roll for receiving the moving material web at a looping angle around a periphery thereof, the heating roll adapted to rotate about a heating roll axis;

(b) first and second guide mechanisms for the material web, which, while maintaining their relative positions to each other, are adapted to pivot together in a pivotal movement around the periphery of the heating roll between a position corresponding to a minimum looping angle and a position corresponding to a maximum looping angle;

(c) the first guide mechanism determining the looping angle at which the material web loops around the periphery of the heating roll;

(d) the second guide mechanism being arranged relative to the first guide mechanism such that in the position of the first and second guide mechanisms corresponding to the maximum looping angle, a portion of the material web not directly wrapping around the heating roll is held at a distance from the periphery of the heating roll by the second guide mechanism; and (e) a third guide mechanism connected in a fixed relationship with the first and second guide mechanisms during the pivotal movement and positioned with respect to the first and second guide mechanisms for completely lifting the moving material web from the periphery of the heating roll at the position of the guide mechanisms corresponding to the minimum looping angle.

2. The heating arrangement of claim 1 wherein at least one of the first guide mechanism, second guide mechanism, or third guide mechanism comprises a guide roll.

3. The heating arrangement of claim 1 wherein the first guide mechanism, second guide mechanism, and third guide mechanism are each connected to a carrier which is connected to pivot about the axis of the heating roll.

4. The heating arrangement of claim 1 wherein the first guide mechanism, second guide mechanism, and third guide mechanism are each mounted at the same clearance from the periphery of the heating roll.

5. The heating arrangement of claim 1 wherein a stationary inlet guide mechanism is provided on an inlet side of the heating roll and a stationary outlet guide mechanism is provided on an outlet side of the heating roll, the inlet guide mechanism and outlet guide mechanism being arranged on substantially a straight line with the longitudinal axis of the heating roll.

6. The heating arrangement of claim 1 wherein the third guide mechanism is offset in an outward radial direction relative to the heating roll in comparison with the first guide mechanism, and wherein the material web wraps around the first guide mechanism and third guide mechanism in an S shape when the first and second guide mechanisms are at the position corresponding to the minimum looping angle.

7. The heating arrangement of claim 6 wherein the third guide mechanism is arranged within an angle defined by axes of the first and second guide mechanisms and the axis of the heating roll.

8. The heating arrangement of claim 1 wherein the third guide mechanism is adapted to move between a working position between the first and second guide mechanisms and a threading position on a side of the first guide mechanism opposite a side on which the second guide mechanism is located.

9. The heating arrangement of claim 8 wherein the third guide mechanism is adapted to be locked in either the threading position or working position.

10. In a heating device having (a) a heating roll mounted for rotation about a heating roll axis and with a peripheral surface about which a moving material web may be looped at a looping angle, and further having (b) first and second guide mechanisms mounted externally from the heating roll and adapted to rotate about the heating roll axis between a position corresponding to a minimum looping angle and a position corresponding to a maximum looping angle, the improvement comprising:

(a) a third guide mechanism mounted externally from the heating roll in a spaced apart position relative to the peripheral surface of the heating roll and relative to the first guide mechanism, the third guide mechanism adapted to move in a fixed position relative to the first guide mechanism and the second guide mechanism as the first and second guide mechanisms rotate between the position corresponding to the minimum looping angle and the position corresponding to the maximum looping angle, the third guide mechanism further being positioned to lift the moving material web from contact with the peripheral surface of the heating roll when the first and second guide mechanisms are in the position corresponding to the minimum looping angle.

11. The heating device of claim 10 wherein the third guide mechanism comprises a guide roll.

12. The heating device of claim 10 wherein the third guide mechanism is mounted on a carrier which is adapted to pivot about the axis of the heating roll.

13. The heating device of claim 10 wherein the first guide mechanism and third guide mechanism are each mounted at the same clearance from the periphery of the heating roll.

14. The heating device of claim 10 wherein the first guide mechanism is mounted in a central location between the second guide mechanism and third guide mechanism.

15. The heating device of claim 10 further including:

(a) a stationary inlet guide mechanism is positioned on an inlet side of the heating roll; and (b) a stationary outlet guide mechanism is positioned on an outlet side of the heating roll, the inlet guide mechanism and outlet guide mechanism being arranged on substantially a straight line with the axis of the heating roll.

16. The heating device of claim 10 wherein the third guide mechanism is offset in an outward radial direction relative to the heating roll in comparison with the first guide mechanism, and wherein the material web wraps around first guide mechanism and third guide mechanism in an S shape when the first and second guide mechanisms are at the position corresponding to the minimum looping angle.

17. The heating device of claim 16 wherein the third guide mechanism is arranged within an angle defined by axes of the first and second guide mechanisms and the axis of the heating roll.

18. The heating device of claim 10 wherein the third guide mechanism is adapted to move between a working position between the first and second guide mechanisms and a threading position on an opposite side of the first guide mechanism with respect to the second guide mechanism.

19. The heating device of claim 18 wherein the third guide mechanism is adapted to be locked in either the threading position or working position.

* * * * *